United States Patent [19]

Gass

[11] E Re. 31,431

[45] Reissued Oct. 25, 1983

[54] MOVABLE WIPER FOR POTENTIOMETERS

[75] Inventor: Ernst Gass, Stuttgart, Fed. Rep. of Germany

[73] Assignee: Novotechnik KG Offterdinger & Co., Ostfildern, Fed. Rep. of Germany

[21] Appl. No.: 387,343

[22] Filed: Jun. 11, 1982

Related U.S. Patent Documents

Reissue of:

[64] Patent No.: 4,237,443
Issued: Dec. 2, 1980
Appl. No.: 50,190
Filed: Jun. 20, 1979

U.S. Applications:

[63] Continuation of Ser. No. 873,702, Jan. 30, 1978, abandoned.

[30] Foreign Application Priority Data

Feb. 17, 1977 [DE] Fed. Rep. of Germany ..... 2706760

[51] Int. Cl.[3] ..... H01C 10/50

[52] U.S. Cl. ..... 338/202; 338/171

[58] Field of Search ..... 338/202, 171, 167, 334; 200/11 K, 11 H, 164 R, 238, 246, 257, 275, 278, 283, 286, 288

[56] References Cited

U.S. PATENT DOCUMENTS

| | | | |
|---|---|---|---|
| 2,266,156 | 12/1941 | Brauer | 200/246 X |
| 2,952,827 | 9/1960 | Semple et al. | 338/142 X |
| 3,188,407 | 6/1965 | Augerinos | 200/288 X |
| 3,194,931 | 7/1965 | Plasko et al. | 200/283 |
| 3,258,571 | 6/1966 | Schmidt, Jr. | 200/283 |
| 3,597,720 | 8/1971 | Burgess | 338/202 |
| 3,704,436 | 11/1972 | Froebe et al. | 338/202 |

*Primary Examiner*—C. L. Albritton
*Attorney, Agent, or Firm*—Shenier & O'Connor

[57] ABSTRACT

A wiper for a potentiometer or other device having a surface with which sliding electrical contact is to be made in which the wiper includes a plurality of spring fingers formed from resilient sheet material or wire are supported in cantilever fashion from ends thereof remote from the contact ends and are encased over a portion of the lengths thereof from the supported ends in a covering of an elastomer which damps vibration of the fingers to prevent resonant oscillations thereof thus increasing the possible speed of operation of the instrument as well as its useful life.

10 Claims, 10 Drawing Figures

MOVABLE WIPER FOR POTENTIOMETERS

Matter enclosed in heavy brackets [ ] appears in the original patent but forms no part of this reissue specification; matter printed in italics indicates the additions made by reissue.

This is a continuation of application Ser. No. 873,702, filed Jan. 30, 1978, abandoned.

BACKGROUND OF THE INVENTION

The invention relates to a movable wiper or slider for potentiometers, variable resistances or the like, as well as for the transmission of current from rotating parts, the former consisting of at least one elastic finger, which rests under pressure on a current-conducting path (runway).

In a multitude of electrical instruments, components and systems, movable wipers or sliders are required and used, which tap, for example, variable voltage potentials from a suitable, exposed resistance. In the following, the invention and facts connected with the latter are discussed in greater detail by means of a potentiometer, and specifically, a circular potentiometer. In such a potentiometer, the path of resistance or runway is applied in form of a coat of material onto a carrier material and scanned by a movable wiper sliding over the path of resistance. Such potentiometers are of considerable importance in the various areas of technology, particularly in process control, the generation of saw-tooth voltages, as a so-called sine-cosine potentiometer, and the like. In fact, such potentiometers can be designed so as to be the only mechanically moving switching elements in entire control systems, whereby it depends on the possible speed, with which the slider or wiper can yet be moved over the runway, i.e. the path of resistance, whether the most varied control and guide tasks can be carried out in an unobjectionable manner.

As well known to the experts of the art, considerable problems arise in the practical manufacture and use of such potentiometers, which are in the main attributable to the fact that the slider or wiper is subjected to vibrations during its sliding motion over the path of the resistance material. These vibrations are caused due to the fact that the slider is forced to rest under a certain pressure on the runway formed by the path of resistance, while this runway, although presenting a completely smooth appearance to the human eye, exhibits on the other hand a considerable unevenness which, when observed with great magnification, shows an array of irregularly arranged mountains, valleys, cavities, humps, grooves, and the like. A slider guided over such a path of resistance is in principle in constant vertical motion caused by this formation of mountains and valleys, and it is only a question of the working velocity, i.e. the relative speed between runway and slider, when appropriate resonant ranges are attained which will cause the slider (and possibly the runway) to be destroyed in a matter of minutes. In the course of such destruction, the individual slider fingers will break off; that is they are literally torn apart and the surfaces of slider and runway, which grind against each other, are rapidly destroyed to an extent that the whole potentiometer becomes quickly unusable.

Of course, such problems are well-known to the experts, and many steps have already been taken to remedy this situation. It should still be pointed out that one of the first essential steps is that of dividing the slider or at least the slider area gliding along the runway into a plurality of individual fingers, e.g. five or more, which represent by themselves each an elastic system and are capable of moving independently from the others. Such sliders can be produced by stamping the fingers out of a suitable sheet metal or by combining a large number of wire-like fingers in a parallel arrangement. At those points where the individual slider fingers rest on the runway, they are bent upward again, thus causing the slider finger to glide along the runway with a definite external radius.

As a first possibility, an attempt has been made to finish the runway, which consists of a suitable resistance material, for instance a carbon coating, in such a way that the roughness of the runway is largely eliminated, i.e. the runway may be honed or polished with a high degree of precision. It seems logical, however, that this process will result merely in a shifting of the problems, for instance into higher speed ranges of the relative movement between slider and runway, for in this case too, vibrations cannot be eliminated. Furthermore, the slider fingers themselves will act as elements of destruction on the runway after a certain period, causing the irregularities in the runway to reappear. In addition, the sliders frequently cannot be prevented from moving in preferred positions at the expense of others, which results in an uneven use of the runway in a longitudinal direction, causing the old problems to reappear after a short period with extremely rapid rotational motion, even when a resistance path polished with high precision was made available at the time of manufacture.

It also has been tried previously to counter the destruction of slider fingers and of the runway by increased spring pressure or by manufacturing the individual fingers themselves from a relatively stiff material (slight elasticity), and bringing all of them to bear on an extremely elastic carrier material. This solution, as well as the additional step of fashioning the individual slider fingers variable in length, proved however unsatisfactory in the long run because the old destruction tended to recur again and again in certain rotational speed ranges. Although efforts of providing the individual fingers with variable resonant frequencies were crowned with success as a result of the aforementioned measure of producing the slider fingers in varying lengths, and this resulted initially in a relatively satisfactory readability of the scanned voltage, destruction of certain fingers at their assigned resonant frequencies could not be prevented, causing the entire potentiometer in the long run to exhibit constantly increasing failure symptoms.

The data expected from a conventional potentiometer can therefore only be approximately of the order of magnitude of 400 to 1000 revolutions/minute, with a total life span of no more than 1 to 2 million revolutions. Such data must be regarded, however, as the upper limit. Under no circumstances are they adequate, however, and they do not permit satisfactory use of potentiometers for high-speed processing of control data, the control of machinery and the like.

The difficulties and problems resulting from the employment of such potentiometers operating with high speeds in modern processing systems, control data equipment etc. are therefore of a complicated nature and of extraordinary importance. They have not been solved to this day in a satisfactory manner and the potentiometers used constituted therefore in each case the weakest link in the chain of components used.

SUMMARY OF THE INVENTION

The invention has its basis in the task of remedying this situation, and to suggest a potentiometer which may be operated at considerably higher speeds, one with a life expectancy increased by orders of magnitude and capable of delivering faultless data also under the most trying operating conditions.

To solve this task, the invention proceeds from the initially mentioned movable wiper or slider for potentiometers and the like, and consists pursuant to the invention of the fact that a coating is applied at least to one finger for the purpose of preventing vibrations, this coating consisting of a material having an elastomer base with high internal friction.

The invention is based on the finding that the difficulties encountered in the operation of potentiometers to date, i.e. the frequent breaking off of the individual slider fingers and the destruction of the entire slider systems, is due to the fact that the slider and, respectively, its fingers constitute free-swinging units, their oscillating frequency being determine by their length, their pressure against the runway, their spring constants and the irregularities of the runway, and last but not least by the relative speed between runway and slider. All attempts at effecting changes in these magnitudes have failed because it was not understood that it is practically impossible to exert significant influence on these magnitudes without putting the function of the potentiometer itself in doubt. The solution of all the problems lies, however, in the creation of a damping for the individual slider fingers, for the purpose of preventing an uncontrolled, prolonged after-vibration of the slider finger at the starting point of the vibration, caused perhaps by the passing of the finger over a hump on the runway, or of an increasingly stronger upward vibration resulting from a periodically recurring additional suitable excitation, and leading almost immediately afterwards to a break or tearing off of tfhe slider finger.

According to a preferred exemplified embodiment pursuant to the invention, the damping of the slider fingers is carried out by coating them with a suitable elastomer material, but in any case with a material exerting a strong damping effect on the characteristic motions of the slider fingers, without exerting, however a significant influence on the elastic properties and remaining characteristic factors of the slider fingers.

The present invention may be employed with particular advantage if a number of individual slider fingers, arranged independently in relation to each other and sliding over the runway, is provided, and if the coating covering all fingers has been designed as a closed skin, enveloping, if necessary, the fingers completely, whereby the wiping area remains of course free. The individual coat of the slider finger damps then not only its vibratory motion, but each and every finger is damped by the movement of the adjacent fingers and damps the latter itself as a result of the statistical distribution of the individual finger movements, because the runway is not expected to exhibit irregularities of such an extent that all fingers will perform an identical lift or drop motion at a given point in time.

BRIEF DESCRIPTION OF THE DRAWINGS

The invention is dealt with subsequently in detail with the aid of the drawings, wherein:

FIG. 2b is a top plan of the slider of FIG. 2a.

FIG. 3b is a top plan of the slider of FIG. 3a.

FIG. 5b is a diagram of the vibratory characteristic during contact of the finger of FIG. 5a.

FIG. 6b is a diagram of the oscillatory characteristic with respect to time of the finger of FIG. 6a.

DESCRIPTION OF THE PREFERRED EMBODIMENT

Figure 1:
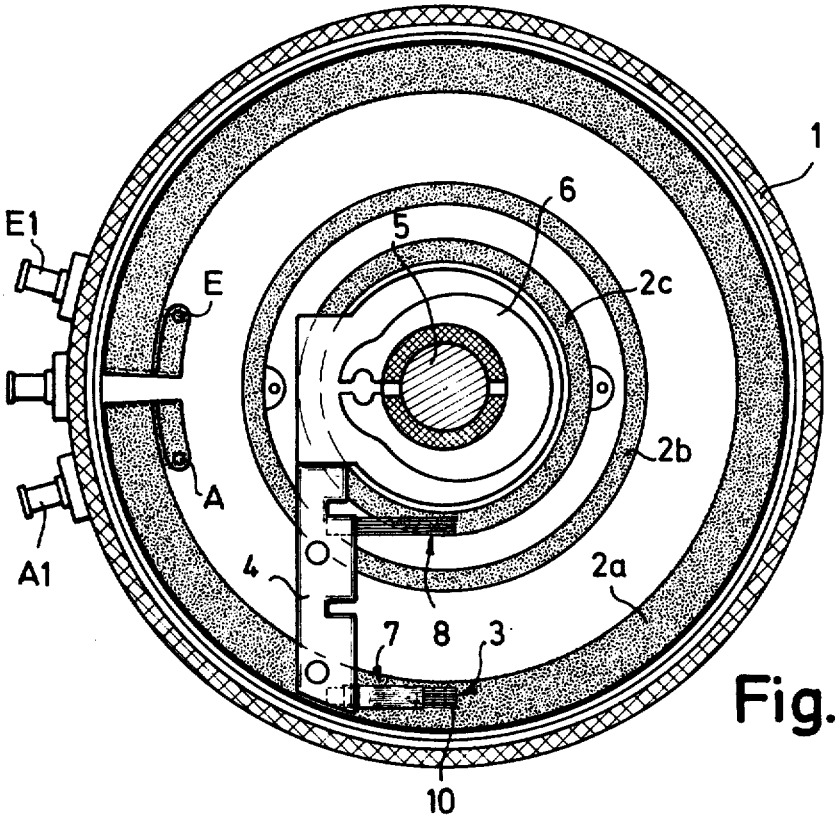
FIG. 1 is a plan view of the opened lower part of a potentiometer with several runways, a slider guide and two sliders moving along the paths of the runways.

In the potentiometer shown in FIG. 1, three different resistance paths 2a, 2b, and 2c are arranged in a bearing housing 1, whereby, for instance, the two inside paths 2b and 2c can serve the voltage or current collection, while the outer path is supplied in a customary manner at both of its connecting ends A and E by way of the external terminals A1 and E1 with a suitable voltage, which is tapped by a wiper or slider 3 moving over this resistance path or runway 2a. The slider 3 is supported by a holder 4, which may be mounted centrally at an axle 5, for example by means of a spring ring 6. The general composition of such a potentiometer is of minor importance. The essential is that for such a potentiometer which is frequently employed for tasks in which the axle is driven with rotational speeds of several hundred revolutions per minute and in part far more, the slider 3 must be capable of providing an absolutely true and identical picture of the voltage output tapped at any given time at such speeds of rotation.

For better understanding, the slider 3 for the outer, circular resistance path 2a is provided pursuant to the invention with a jacket 7 made from an'elastomer base, whereas the slider 8 for the inside runway 2c conforms to the customary conventional composition.

Figure 2A:
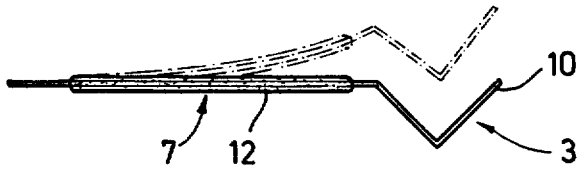
FIG. 2a is a side elevation of a first embodiment of a slider.
Figure 2B:
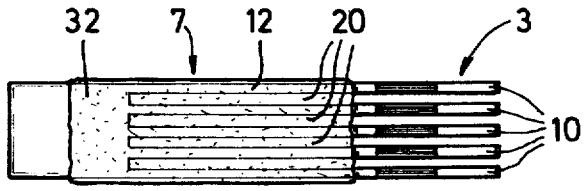
Figure 3A:
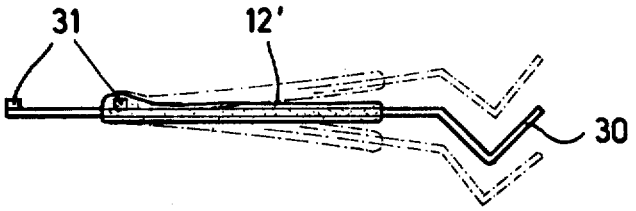
FIG. 3a is a side elevation of a second embodiment of a slider.
Figure 3B:
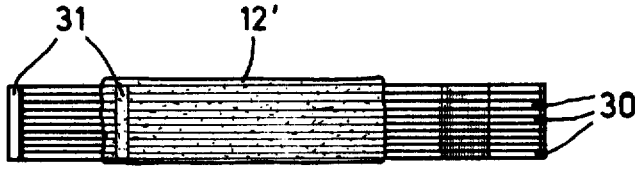

Suitable sliders are again illustrated in FIGS. 2a and 2b, as well as in FIGS. 3a and 3b, both in side and plan view. These latter figures display also in particularly distinct manner the damping measure pursuant to the invention, according to which a certain elastomer material 12 is applied to at least one of the slider fingers, while in the practical embodiments all slider fingers 10 are provided with this material. This elastomer material is of rubber, caoutchouc, another elastomer, or in general any material exhibiting almost no resiliency properties or none at all, while being extremely yielding and acting essentially as a damper on finger motion. If such a material is, for instance, shaped as a foil of a certain thickness, say 1 mm, and is grasped, it will hang flat in a downward direction, but it has a considerable internal friction and is thus capable of exerting a strong damping influence on the movement of the slider fingers.

A suitable material is, for instance, silicone rubber, whereby it is pointed out at once, that the material does not significantly impair the working movement of the individual slider fingers or has no influence on the latter at all, while it prevents with certainty the upward development of a vibration from the individual working motions, which can lead to the destruction of the slider. To clarify what is meant in this respect, reference is made to the representation of FIG. 4, which shows the surface 16 of a resistance path or runway 2 both in a rough and also enlarged view. This surface exhibits innumerable irregularities, forming together a hill and valley profile, which, however, does not traverse the runway in a regular manner across its width, but presents for the adjacent slider fingers an absolutely variable shape and structure.

Figure 4:
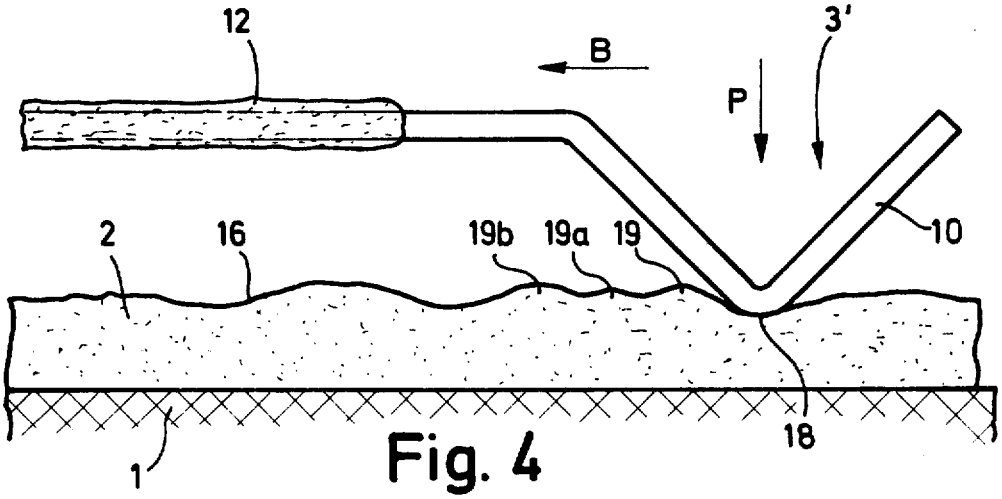
FIG. 4 is a rough representation of an enlarged section of the runway with a slider arranged on the latter.
Figure 5B:
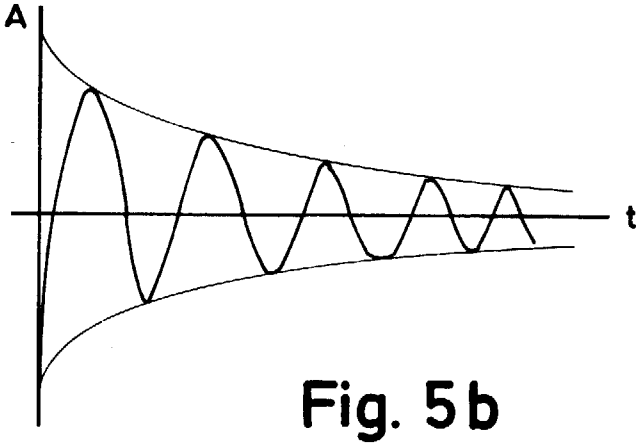
Figure 6B:
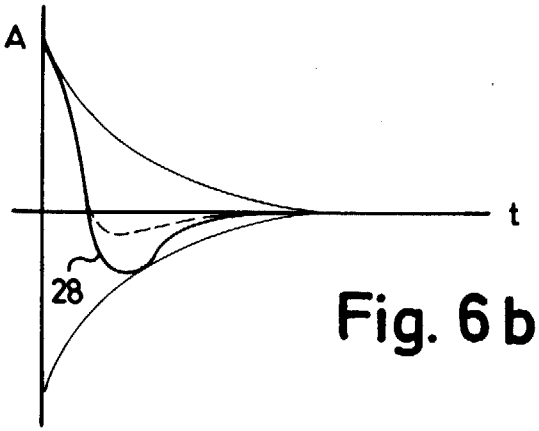
Figure 5A:
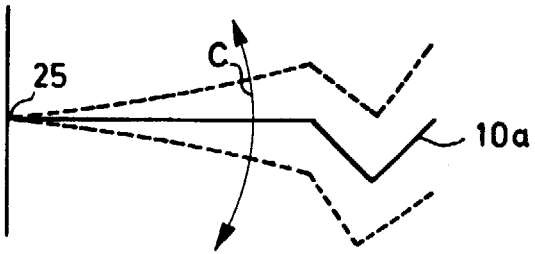
FIG. 5a is a view of a slider finger cantilevered at one end.
Figure 6A:
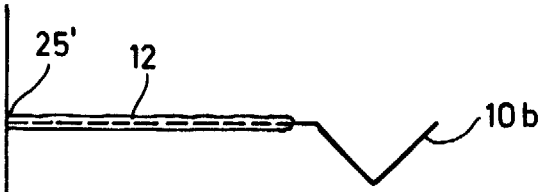
FIG. 6a is a view of a slider finger constructed in accordance with the invention.

When the slider 3'', as shown in FIG. 4, glides with its individual slider fingers 10 over such a runway, the sliding surfaces 18 of the slider 10 and along with it the entire slider finger 10 is lifted upward by each hump or hill 19, 19a, 19b encountered by it anew, and this against the pressure force P, by means of which the slider finger 10 tries to remain on the runway, in order to assure flawless current transmission. It can be seen immediately that it is a question of the relative speed of the slider 3', which moves in the direction of the arrow B, whether the slider manages to maintain electrical contact in the valley areas, or respectively, from what speed on the vibrations excited by the humps and valleys affect the slider finger 10 in such staged synchronized timing, that the latter is stimulated into vibration which may increase to such an extent as to result in destructions in the slider area of a kind hardly to be expected.

As a result of the coating of the slider finger or fingers indicated in FIG. 4 at 12, such a strong damping is attained, however, that resonant symptoms are no longer present and the guidance of the slider finger 10 on the runway is considerably improved. This phenomenon becomes especially evident when the jacket 12' of FIGS. 3a and 3b, which covers approximately the entire slider area, is observed. The extremely pliable coating material, which exhibits, however a high internal friction and envelops the entire slider, thereby also filling out in particular the spaces between the individual slider fingers, as shown at 20 in FIG. 2b, acts thereby in such a manner that as a result of the completely irregular movement executed by the adjacent slider fingers, a standstill of vibrations can be attained in the mean for all practical purposes, i.e. the coating is fashioned in such a way as to average the individual oscillation phenomena, vibrations and motions of the slider fingers, resulting for all practical purposes in a standstill during the dynamic course and an almost completely smooth sweep of the resistance path 2.

For this reason, the data attained with potentiometers and their sliders pursuant to the invention are also utterly surprising for the expert, for while it had hardly been possible with the customary potentiometers to exceed speeds of rotation of more than 400 rpm, it is now possible with the potentiometers pursuant to the invention, to perform up to 10,000 revolutions per minute without the slightest disturbance. Of almost even greater importance, however, is the fact that potentiometer pursuant to the invention are capable of performing up to 40 to 50 million revolutions without destruction, i.e. the design of the potentiometer pursuant to the invention permits not only to double or triple the lifespan, which is of considerable importance for industrial uses, but to increase it twenty to thirty-fold. The lifespan is hereby practically independent of the work speed, ergo the rotational speed of the potentiometers, making it possible to solve at one stroke considerable problems, which should not be underestimated.

The effect of an elastomer coat, which exerts a strong, damping influence on an oscillating motion, can, if one observes for the moment a single slider finger, be explained in that way, that the coating applied to the slider finger preferably on all sides, experiences during a vibratory motion on one side a compression, and on the other an extension, therefore a treatment which the elastomer coat resists due to its internal friction, with the result that a damping counter-force against the vibratory movement is built up which is decidedly on target and capable almost by itself to bring interfering resonant vibrations into a range, in which they are of no significance.

The effect of the elastomer coating is raised, however, when, as is customary with sliders per se, a plurality of slider fingers is used, which are all surrounded with a contiguous sheathing of uniform structure, whereby the sheathing also penetrates into the spaces and connects with the lower layer. The individual slider fingers can hereby, as already mentioned, also still move freely. The adjacent slider fingers, however, perform at a statistical average an opposite movement in at least half of all occurring motions and absorb therefore the movement of a slider finger proceeding in the opposite direction. It is therefore practically impossible, especially because of the statistical uncertainty about mutual effects, that natural vibrations are initiated.

It is understood that the measure pursuant to the invention includes all suitable coating materials, and in particular those which work on an elastomer base with high internal friction and corresponding resilience. Silicone rubber or polyurethane plastic of appropriate properties, for instance, have proven to be suitable.

The FIGS. 5a, 5b, and 6a, 6b show, when compared, a customary slider design as well as a slider coated and surrounded pursuant to the invention with an elastomer material. The slider illustrated in FIG. 5a, and which can also consist of a plurality of slider fingers 10a, arranged so as to be lying adjacent to each other, is clamped at 25 and performs upon being plucked an oscillating movement in the direction of the double arrow C, whereby this movement runs only very faintly dampened in accordance with the curve projected in FIG. 5a. A respective comparison with a slider finger 10b coated or enveloped at 12 with an elastomer material shows, that the former returns for all practical purposes immediately to its rest position and, depending on the properties of the elastomer material, swings over only once, as shown at 28, or returns practically at periodic intervals to its original position.

The sliders may, as shown in FIG. 2b, be stamped out of a suitable spring plate material, although they can consist also of a plurality of individual elastic wire strands 30 arranged in parallel adjacent to each other, which are held together in the area of their rear ends by two lateral bridges 31. The connection at this spot may be made by welding or in another suitable manner.

The elastomer coat 12, 12' can be applied to the cleaned slider by immersing or coating, whereby, as illustrated in FIGS. 2a, 2b, 3a, and 3b, the sliding area, that is the approximately triangular-shaped curved plane forming the lower sliding surface, remains free of the coating material. There exist many possibilities to execute the coating by special coordination with the objective of making it larger or smaller, or by coating only certain partial surfaces, such as, for instance, the upper surface area of the slider.

It is practical to extend the coating, as shown in FIG. 2b, beyond the common connecting area 32 of the individual slider fingers 10, and to bring it in any case up to this area, since the connecting area 32 is used at the same time for clamping and does not bounce along during operation. The elastomer coating material finds therefore a stationary support also in this area (stationary with respect to the vibrations performed by the slider fingers 10), so that a correspondingly improved damping can be attained.

The invention is suitable for application with any wiper or slider systems, and also for those in which the slider itself is arranged stationary and rests on a rotating part, whereby current is transmitted in the contact area. It is extremely important also in this case, that the slider does not jump or rattle, as this will cause spark formation with the resultant destruction of parts exposed to it.

Having thus described my invention, what I claim is:

1. In a wiper for high speed adjustable resistance, potentiometers and the like having a plurality of electrically conductive and flexible fingers which slidably engage a conductive surface along a given path and in which the fingers are arranged in parallel to each other with lateral separations therebetween and are carried by a relatively rigid support and having each a flexible length which extends outwardly from said support and in engagement with said conductive surface, the improvement comprising a common covering of yieldable elastomeric material extending over portions of said flexible lengths of said parallel fingers extending outwardly from said support and over portions of said lateral separations between said length portions to form a continuous covering over said length and separation portions, said elastomeric material having a high degree of internal friction and practically no elasticity thereby exerting a high dampening force on a possible oscillating movement of each of said fingers, the contact area of the wiper with said conductive surface being free of said elastomeric material.

2. A high speed potentiometer including in combination, a generally circular resistance path, a wiper having a plurality of electrically conductive fingers arranged parallel to each other with lateral separations therebetween, a rigid support, means mounting said wiper on said support with flexible lengths of said fingers extending outwardly from said support and in engagement with said resistance path, means mounting said support for rotary movement around an axis to slide the portions of said lengths contacting said path along said path, and a common covering of yieldable elastomeric material extending over portions of said flexible lengths of said parallel fingers extending outwardly from said support and over portions of said lateral separations between said length portions to form a continuous covering over said length and separation portions, said elastomeric material having a high degree of internal friction and practically no elasticity thereby exerting a high dampening force on a possible oscillating movement of each of said fingers, the contact area of the wiper with said resistance path being free of said elastomeric material.

3. An improvement as in claim 1 in which said coating encases said wiper over an area outside said contact area.

4. An improvement as in claim 1 in which said coating material is silicone rubber.

5. An improvement as in claim 1 in which said coating material is polyurethane.

6. An improvement as in claim 3 in which said coating material is silicon rubber.

7. An improvement as in claim 3 in which said coating material is polyurethane.

8. An improvement as in claim 1 in which said support and said fingers form a unitary body, and in which said covering envelops a portion of said fingers and at least a portion of said support.

9. An improvement as in claim 8 in which said elastomeric material is silicone rubber.

10. An improvement as in claim 8 in which said elastomeric material is polyurethane.

* * * * *